United States Patent Office 3,657,243
Patented Apr. 18, 1972

3,657,243
PYRIDAZONE COMPOUNDS AND PROCESS
FOR THEIR PRODUCTION
Juan Miquel Quintilla, Calle Viladomat 71,
Barcelona, Spain
No Drawing. Filed June 20, 1969, Ser. No. 835,215
Claims priority, application Spain, June 27, 1968,
355,900
Int. Cl. C07d 51/04
U.S. Cl. 260—250 A
11 Claims

ABSTRACT OF THE DISCLOSURE

Certain 6-substituted α-(3-pyridazon - 2 - yl) aliphatic acids, salts and in particular substituted amides are disclosed, and processes for their manufacture.

The substituted amide compounds include those having valuable anti-inflammatory action in humans and animals, especially when they are optically active. (—)N-methyl - N - (2-phenylisopropyl)2-2(6 phenyl-3-pyridazonyl) acetamide is particularly mentioned.

BACKGROUND OF THE INVENTION

This invention relates to chemical compounds of the pyridazone series and methds for their production, but more specifically it is concerned with the obtaining of new derivatives of α-(3-pyridazon-2-yl) aliphatic acids, which comprise in the 6-position of the pyridazone one of an aryl, substituted aryl, alkyl, substituted alkyl, aryloxy, alkoxy, mercapto, halo, $CF_3$ radical or other haloalkyls, amino, alkylamino, acylamino, arylamino, substituted arylamino, aryl-thioalkyl radicals, and heterocyclic compounds of 5 and 6 atoms in the ring, as well as their salts, esters and especially the amides of these compounds.

SUMMARY OF THE INVENTION

The 6-substituted alpha-(3-pyridazon-2-yl) aliphatic acids of the present invention may be obtained by a process within the present invention and have the general formula

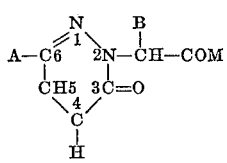

in which A is selected from those referred to in the preceding paragraph; B is hydrogen, low alkyl, low alkenyl or aryl; M represents a substituted or unsubstituted amido group, or a hydroxyl, salt or alkoxyl group.

These substances can be considered as functionally substituted pyridazones. However, they are preferably described as nitrogenated derivatives of the low α-(3-pyridazon-2-yl) aliphatic acids with substituents on the 6-carbon of the pyridazone ring.

The present invention includes compounds of pyridazone aliphatic acids of the structural formula

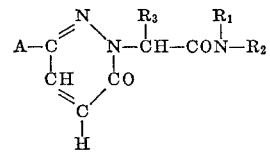

in which; $R_1$ is one of hydrogen, a low alkyl, low alkenyl, low alkoxy, aralkyl and aryloxy chain; $R_2$ is one of a low alkyl or low alkenyl chain; $R_3$ is one of a hydrogen, a low alkyl group and low alkenyl group and A has the meaning indicated above.

The low alkyl or low alkenyl chain $R_2$ can carry one or more hydrogen atoms substituted by aryl radicals, the preferred compounds being those which have a centre of asymmetry in the carbon atom adjacent the amido nitrogen.

The present invention includes derivatives of the structural formula

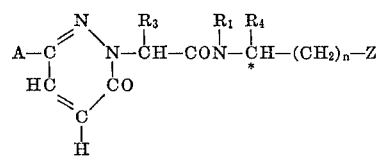

in which A, $R_1$ and $R_3$ have the meaning indicated in the preceding paragraphs; $R_4$ is an alkyl or alkenyl chain; Z is any radical, preferably an aryl or substituted aryl radical; n is a number which can vary between zero and four. As an example of the radicals with which one or more of the hydrogen atoms of the aryl can be substituted, it is possible to mention: alkoxy, halo, haloalkyl, trifluoromethyl, beta-chlorethyl or the like; acyl, benzoyl, propionyl, phenacetyl and other similar radicals.

The preferred compounds of the present invention are the nitrogenated derivatives of the amido type of the said pyridazone aliphatic acids with substituents on the nitrogen, at least one of which has an asymmetrical carbon atom directly bonded to the said amido nitrogen.

One process which has been found useful for the preparation of the said compounds consists in the preparation of the required alpha-pyridazone aliphatic acids and condensed by way of their esters, chlorides or anhydrides, with the corresponding substituted amines. One variant of the process for the preparation of the said compounds consists in preparing the haloalkanylamido derivatives and condensing them with the corresponding substituted pyridazones.

The following compounds, are examples only of those included within the scope of the invention and capable of being obtained by processes within the said invention.

N-methyl-N(2-phenylisopropyl)-2-(6-dibenzofuryl-3-pyridazonyl)acetamide

N-methyl-N(2-phenylisopropyl)-2-(6-p-bromophenyl-3-pyridazonyl)acetamide

N-methyl-N(1-isobutyl-2-phenylethyl)-2,6-(3,4-dichlorophenyl)-3-pyridazonyl)acetamide N-ethyl-(N-phenylisopropyl)-2-(6-ethyl-3-pyridazonyl)-acetamide N-methyl-N(2-phenylisopropyl)-2-(6-methoxy-3-pyridazonyl)acetamide N-methyl-N(2-phenylisopropyl)-(6-hydroxy-3-pyridazonyl)acetamide N-allyl-N(2-phenylisopropyl)-2-(6-methyl-3-pyridazonyl)acetamide N-methyl-N(2-phenylisopropyl)-2-(6-(benzylthio)methyl-3-pyridazonyl)acetamide N-methyl-N(2-phenylisopropyl)-2-(6-butoxy-3-pyridazonyl)acetamide N-methyl-N(2-phenylisopropyl)-2-(6-phenyl-3-pyridazonyl)acetamide N-methyl-N(2-phenylisopropyl)-2-(6-isopropylsulphonyl-3-pyridazonyl)acetamide N-(2-phenylisopropyl)-2-(6-phenyl-3-pyridazonyl)acetamide N-methyl-N(2-phenylisopropyl)-2-(6-(2-thienyl)-3-pyridazonyl)acetamide N-methyl-N(2-phenylisopropyl)-2-(6-(2-thienyl)-3-pyridazonyl)acetamide N-methyl-N(2-phenylisopropyl)-2-(6-acetamido-3-pyridazonyl)acetamide N-methyl-N(2-phenylisopropyl)-2-(6-(2-furyl)-3-pyridazonyl)acetamide N-methyl-N(2-phenylisopropyl)-2-(6-p-methoxyphenyl-3-pyridazonyl)acetamide N-methyl-N(2-phenylisopropyl)-2-(6-hexyl-3-pyridazonyl)acetamide N-methyl-N(1-methyl-2-(p-methoxy)ethyl-2-(6-phenyl-3-pyridazonyl)acetamide N-methyl-N(1-methyl-2(p-chlorophenyl)ethyl)-2-(6-phenyl-3-pyridazonyl)acetamide N-benzyl-N(1-methyl-2-(o-methoxyphenyl)ethyl)-2-(6-phenyl-3-pyridazonyl)acetamide N-methyl-N(1-methyl-2-(3,4-methylenedioxyphenyl)ethyl)-2-(6-phenyl-3-pyridazonyl)acetamide N-methyl-N(1-methyl-2(3,4-methylenedioxyphenyl)ethyl)-2-(6-phenyl-3-pyridazonyl)acetamide N-ethoxy-N(2-phenylisopropyl)-2-(6-phenyl-3-pyridazonyl)acetamide N-isopropoxy-N(2-phenylisopropyl)-2-(6-phenyl-3-pyridazonyl)acetamide N-methyl-N(1-veratryl-(3,4-dimethoxyphenyl)ethyl)-2-(6-phenyl-3-pyridazonyl)acetamide N-benzyl-N(1-methyl-2-(o-methoxyphenyl)ethyl)-2-(6-phenyl-3-pyridazonyl)acetamide N-isopropyl-N(2-phenylisopropyl)-2-(6-phenyl-3-pyridazonyl)acetamide The amides of the alpha-(3-pyridazon-2-yl) aliphatic acids within this invention may be prepared by treating the chlorides, simple esters or anhydrides of the corresponding substituted acids, as stated, in the 6-position of the pyridazone, with the substituted amines.

One modification of the process consists in condensing the salts of alkaline metals of the pyridazones substituted in the 6-position with the corresponding substituted haloalkanylamides. The diagram will be:

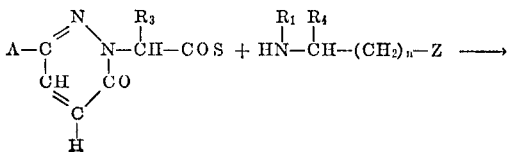

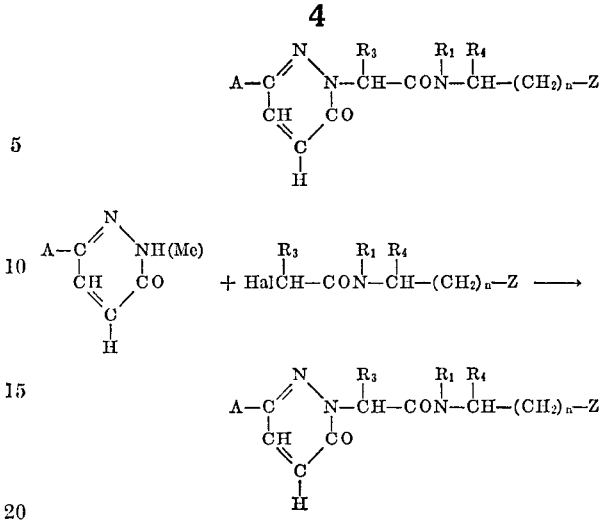

in which Me represents alkaline metal; S represents alkoxy or halogen and $R_1$, $R_3$, $R_4$, Z and $n$ represents the same as that indicated in the preceding paragraph, Hal represents halogen. The experimental procedures used for the preparation of the said substituted pyridazones by the process of this invention are described in the literature. The preparation of the corresponding esters is effected by condensing low α-haloaliphatic esters with the alkaline salt of the corresponding substituted pyridazone.

The amines which are used as starting materials are prepared by the general methods described in the literature, whereas the corresponding haloalkanylamides are prepared, also in generally known manner, by condensing haloalkanyl halides (usually the chloride) with the appropriate amine in the presence of a hydrogen halide acceptor.

In one process within the present invention, it has been observed that by 1-(3-phenyl-6-pyridazone)methyl acetate being heated to temperatures of the order of 150–170° C. with N - alpha-dimethylphenethylamine, N-methyl-N(2-phenylisopropyl) - 2 - (6-phenyl - 3 - pyridazonyl) acetamide is obtained.

The presence of an appropriate solvent assists the formation of the products, but this is not essential.

When working in the presence of an alkali metal or an alkali hydroxide, namely, 6-phenyl - 3 - pyridazone on the one hand and N-methyl-N-phenylisopropylchloracetamide on the other hand, and after heating the medium and using solvents, which can be low alkanols, the corresponding amide is obtained, i.e.: N-methyl-N(2-phenylisopropyl)-2-(6-phenyl-3-pyridazonyl)acetamide.

When the amines or haloalkanylamides used in the foregoing reactions are optically active, the optically active pyridazonyl alkanoamides are obtained. Specifically, when L - (—) - N - alpha-dimethylphenethylamine is condensed with chloroacetyl chloride, L-(—)-N-methyl-N-phenylisopropylchloroacetamide is obtained.

If L-(—)-methyl - N - phenylisopropylchloracetamide is condensed with the alkali salt of 6-phenyl-3-pyridazone, then L-(—)-N-methyl-N-(2-phenyl - isopropyl) - 2 - (6-phenyl-3-pyridazonyl)acetamide is obtained, of which the specific rotation is $$[\alpha] = -58° \text{ (methanol)}$$

By operating in an identical manner, the dextro derivative is obtained, when starting with dextrorotatory amines or haloalkanylamides.

It has been shown by numerous experiments in connection with veterinary pharmacology and human clinical procedure that some of the compounds described in the present patent of invention are useful for the treatment of cerain diseases of the human organism and of the animals with which experiments have been carried out.

It has accordingly been possible to observe that the product (—) N-methyl-N-(2-phenylisopropyl) - 2 - (6- phenyl-3-pyridazonyl)acetamide has decided anti-inflammatory properties in test animals, exceeding in this respect, with an appropriate dose, the activity achieved by other anti-inflammatory preparations.

This product has an $LD_{50}$ in rats of 330 mg./kg. when administered intraperitoneally, and higher than 650 mg./kg. when administered per os.

The best possible doses for providing a maximum anti-inflammatory activity are 56 mg./kg. intraperitoneally, and 100 mg./kg. perorally for the said animals. By comparing these figures with those of the acute lethal nature, it is observed that this is a product with a wide therapeutic ratio (approximately 1:6).

The pharmacological tests to which the said substance has been subjected have shown that it lacks any teratological effects; the spontaneous activity of the tested animals is unchanged, nor is the arterial tension or the activity of the heart in situ modified; neither, with a normal dose, is there any action on the musculature, the thermoregulation nor the diuresis. Tests for chronic toxicity show that the product is without harmful effects on the organs of the animals.

In human clinical tests, this compound has been found to be useful in the treatment of the diseases in which inflammation is its most essential feature, inter alia, chronic infectious polyarthritis (rheumatoid arthritis), mixed arthrosis, traumatic arthritis, scapulohumeral periarthritis, etc.

The oral dose varies between 400 and 800 mg./kg. per day, whereas the most preferred rectal doses will be between 600 and 1200 mg./day.

The tolerance was found to be clinically good, being used for invalids for periods of more than 1 year without any secondary effects being observed.

Some of the products referred to herein are better tolerated in an equipotential dose than certain pyridazoline and indole derivatives currently used as anti-inflammatory agents.

The following examples are provided by way of illustration, without having any limiting effect.

EXAMPLE 1

N-methyl-N(2-phenylisopropyl)-2-(6-phenyl-3-pyridazonyl)-acetamide

In a flask equipped with stirring means and a reflux condenser are dissolved 200 g. of 6-phenyl-3-pyridazone in a solution of 107 g. of KOH in 2300 cc. of methanol. Once dissolved, 260 g. of N-methyl-N-(2-phenylisopropyl)chloracetamide are added dropwise, while being subjected to reflux for three hours. The product which forms is filtered and the solvent is evaporated. It is recrystallised from petroleum ether and benzene. Melting point: 103–105° C. When L-(—)-N-methyl - N - (2-phenylisopropyl) chloracetamide issued, the product obtained deflects the polarisation plane of the polarised light towards the left, its specific rotation being $[\alpha] = -58°$ (methanol)

EXAMPLE 2

N-(2-phenylisopropyl)-2-(6-phenyl-3-pyridazonyl) acetamide 5.7 g. of 6-phenyl-3-pyridazone are dissolved in 71 cc. of methanol containing 2.6 g. of KOH. 7 g. of N-(2-phenylisopropyl)chloracetamide are added continuously and refluxing takes place for 5 hours. The formed solid is filtered and the solvent is concentrated. The residue is recrystallised from ethanol. Melting point: 168–170° C.

EXAMPLE 3

N-ethyl-N(2-phenylisopropyl)-2-(6-ethyl-3-pyridazonyl)-acetamide

To a solution of 500 cc. of methyl alcohol containing 2.3 g. of sodium are added 11.2 g. of 6-ethyl-3-pyridazone and it is refluxed with 23.9 g. of N-ethyl-N-(1-methyl-2-phenylethyl)chloracetamide for 3 hours. The formed precipitate is filtered, the solvent is evaporated and it is recrystallised from isopropanol.

EXAMPLE 4

N-allyl-N(2-phenylisopropyl)-2-(6-methyl-3-pyridazonyl)-acetamide 25 g. of 6-methyl-3-pyridazone are dissolved in 250 cc. of methanol, which contains 10 g. of potassium hydroxide. The said solution has slowly added thereto a solution of 63 g. of N-allyl-N-(2-phenylisopropyl)chloracetamide in methanol. Reflux takes place continuously for some three hours. The KCl is filtered and it is concentrated, eliminating the main quantity of methanol. The residue is recrystalllised from ethanol. Melting point: 97–101° C.

EXAMPLE 5

N-methyl-N(2-phenylisopropyl)-2-(6-p-methoxyphenyl-3-pyridazonyl)acetamide 20 g. of 6-p-methoxyphenyl-3-pyridazone are dissolved in a solution of 8 g. of KOH in 300 cc. of methanol. Thereafter 22 g. of N-methyl-N(2-phenylisopropyl)chloracetamide are added, and the substance is refluxed for 5 hours. It is concentrated, eliminating the major part of the solvent, previously filtered from the formed KCl. The residue is recrystallised from dipropyl ether. Melting point: 135–136° C.

EXAMPLE 6

N-methyl-N-[1-methyl-2-(3,4-dimethoxyphenyl)ethyl]-2-(6-phenyl-3-pyridazonyl)acetamide 0.1 mol of ethyl 6-phenyl-3-pyridazon-2-acetate are suspended in 300 cc. of toluene while adding thereto 28 g. of N-methyl-N(1-methyl-2-(3,4-dimethoxyphenyl) ethylamine and refluxing for 16 hours. The solution is cooled and the solvent is evaporated in vacuo. The resulting product is subjected to chromatography on $Al_2O_3$ and is recrystallised from ethanol.

Melting point: 138–139° C.

EXAMPLE 7

N-isopropoxy-N-(2-phenylisopropyl)-2-(6-phenyl-3-pyridazonyl)acetamide

To one centimal of potassium salt of 6-phenyl-3-pyridazone, dissolved in 50 cc. of methanol, are added 3 g. of N-isopropoxy-N-(2-phenylisopropyl)chloracetamide while refluxing for 5 hours. The formed precipitate is filtered and the residue is recrystallised from isopropanol. Melting point: 67–68° (with crystallised isopropyl alcohol).

EXAMPLE 8

N-isopropyl-N(2-phenylisopropyl)-2-(6-phenyl-3-pyridazonyl)acetamide

A solution of 18 g.of sodium salt of 6-phenyl-3-pyridazone in 200 cc. of methanol is refluxed with 25 g. of N-isopropyl - N(2 - phenylisopropyl)chloracetamide for 2 hours. The residue is concentrated and is allowed to crystallise from dioxane. Melting point: 140–141° C.

EXAMPLE 9

N-(2-phenylisopropyl)-(6-methyl-3-pyridazone) acetamide 12.7 g. of 6-methyl-3-pyridazone are dissolved in a solution of 6.2 g. of KOH in methanol. 21 g. of N-(2-phenylisopropyl)chloracetamide are added continuously and refluxed for 5 hours. The solid which forms is filtered and the solvent is evaporated. The residue is recrystallised from ethyl alcohol. Melting point 175–178° C.

These products are of value for therapeutic purposes.

I claim:
1. A compound of the formula:

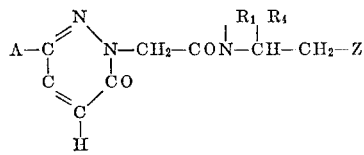

wherein A is selected from the group consisting of alkyl of up to 6 carbon atoms, hydroxyl, phenyl-methoxyphenyl, bromophenyl, dichlorophenyl, lower alkoxy, furyl, dibenzofuryl, benzylthio, isopropylsulfuryl, thienyl and acetamido; wherein $R_1$ is selected from the group consisting of hydrogen, allyl, lower alkyl, lower alkoxy and benzyl; wherein $R_4$ is lower alkyl; and wherein Z is selected from the group consisitng of phenyl, phenyl lower alkyl, lower alkoxy phenyl, lower dialkoxy phenyl, chlorophenyl and methylenedioxyphenyl.

2. Compound according to claim 1 wherein said compound is N-methyl-N-(2-phenylisopropyl)-2-(6-phenyl-3-pyridazonyl)-acetamide.

3. Compound according to claim 1 wherein said compound is N-(2-phenylisopropyl)-2-(6-phenyl-3-pyridazonyl)acetamide.

4. Compound according to claim 1 wherein said compound is N-ethyl-N-(2-phenylisopropyl)-2-(6-ethyl-3-pyridazonyl)-acetamide.

5. Compound according to claim 1 wherein said compound is N-alkyl-N(2-phenylisopropyl)-2-(6-methyl-3-pyridazonyl)-acetamide.

6. Compound according to claim 1 wherein said compound is N-methyl-N(2-phenylisopropyl)-2-(6-p-methoxyphenyl-3-pyridazonyl)acetamide.

7. Compound according to claim 1 wherein said compound is N-methyl-N-[1-methyl-2-(3,4-dimethoxyphenyl)ethyl]-2-(6-phenyl-3-pyridazonyl)acetamide.

8. Compound according to claim 1 wherein said compound is N-isopropoxy-N-(2-phenylisopropyl)-2-(6-phenyl-3-pyridazonyl)acetamide.

9. Compound according to claim 1 wherein said compound is N-isopropyl-N(2-phenylisopropyl)-2-(6-phenyl-3-pyridazonyl)acetamide.

10. Compound according to claim 1 wherein said compound is N-(2-phenylisopropyl)-(6-methyl-3-pyridazone)acetamide.

11. Method of producing a compound of claim 1, which comprises reacting in an inert solvent medium a haloalkanylamide of the formula:

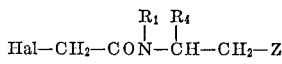

wherein Hal is chlorine and wherin $R_1$, $R_4$ and Z have the same meanings as in claim 1 with an alkali metal salt of a compound of the formula:

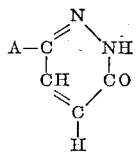

wherein A has the same meaning as in Example 1, thereby forming as a condensation product the compound of claim 1.

References Cited

FOREIGN PATENTS 217,467  10/1961  Austria _____ 260—250 A

NICHOLAS S. RIZZO, Primary Examiner

U.S. Cl. X.R.

424—250